United States Patent
Tonnerre

(10) Patent No.: US 11,589,267 B2
(45) Date of Patent: Feb. 21, 2023

(54) SYSTEMS AND METHODS OF MANAGING RADIO RESOURCES OF AN AIRPORT COMMUNICATION SYSTEM

(71) Applicant: Thales Avionics, Inc., Irvine, CA (US)

(72) Inventor: Arnaud Tonnerre, Rockledge, FL (US)

(73) Assignee: Thales Avionics, Inc., Irvine, CA (US)

(*) Notice: Subject to any disclaimer, the term of this patent is extended or adjusted under 35 U.S.C. 154(b) by 11 days.

(21) Appl. No.: 16/697,505

(22) Filed: Nov. 27, 2019

(65) Prior Publication Data
US 2021/0160739 A1    May 27, 2021

(51) Int. Cl.
*H04W 28/26*    (2009.01)
*H04W 4/42*    (2018.01)
*H04B 7/185*    (2006.01)

(52) U.S. Cl.
CPC ........ *H04W 28/26* (2013.01); *H04B 7/18506* (2013.01); *H04W 4/42* (2018.02)

(58) Field of Classification Search
CPC ... H04W 28/26; H04W 72/048; H04W 72/10; H04W 36/32; H04W 12/06; H04W 4/06; H04W 4/44; H04W 8/02; H04W 4/42; H04B 7/18506; H04B 1/0003; G08G 5/0013; G08G 5/0021; H04L 63/0892; H04L 67/12
See application file for complete search history.

(56) References Cited

U.S. PATENT DOCUMENTS

| | | | |
|---|---|---|---|
| 6,487,595 B1 | 11/2002 | Turunen et al. | |
| 9,607,447 B2* | 3/2017 | Gremmert | G01S 13/953 |
| 2015/0065147 A1* | 3/2015 | Kuwahara | H04W 4/44 |
| | | | 455/441 |
| 2015/0296500 A1* | 10/2015 | Kanovsky | H04B 7/18506 |
| | | | 455/512 |
| 2018/0343570 A1* | 11/2018 | Misenheimer | H04W 72/0453 |
| 2019/0043369 A1* | 2/2019 | Miller | G08G 5/0008 |

* cited by examiner

*Primary Examiner* — Rushil Parimal Sampat
(74) *Attorney, Agent, or Firm* — Sage Patent Group

(57) ABSTRACT

A radio resource management system in communication with multiple airport communication systems located at different airports is described. The radio resource management system receives a request to transfer data from an aircraft communication system within an aircraft to an airport communication system of the multiple ground communication systems. The radio resource management system determines an availability of radio resources at each airport communication system of the multiple airport communication systems based on the request. The radio resource management system selects an airport communication system from the multiple airport communication systems to transfer the data based on the determined availability of radio resources at the airport communication system. The radio resource management system reserves an amount of radio resources of the selected airport communication system of the multiple airport communication systems for the aircraft communication system to transfer the data.

24 Claims, 12 Drawing Sheets

DETERMINE A RESOURCE COST METRIC ASSOCIATED WITH THE AMOUNT OF RADIO RESOURCES AVAILABLE AT EACH AIRPORT COMMUNICATION SYSTEM BASED ON THE DETERMINED AVAILABILITY OF THE RADIO RESOURCES AT EACH AIRPORT COMMUNICATION SYSTEM DURING A DATE AND A TIME RANGE IN THE FUTURE WHEN THE AIRCRAFT IS ANTICIPATED TO BE LOCATED AT DIFFERENT AIRPORTS WHICH ARE SERVICED BY DIFFERENT AIRPORT COMMUNICATION SYSTEMS OF THE MULTIPLE COMMUNICATION SYSTEMS
500

SELECTING THE AIRPORT COMMUNICATION SYSTEM FROM THE MULTIPLE AIRPORT COMMUNICATION SYSTEMS TO TRANSFER THE DATA BASED ON THE DETERMINED AVAILABILITY OF RADIO RESOURCES AT THE SELECTED AIRPORT AND THE RESOURCE COST METRIC ASSOCIATED WITH THE SELECTED AIRPORT COMMUNICATION SYSTEM
502

FIG. 5

```
┌─────────────────────────────────────────────────────────────────────┐
│ DETERMINE THAT THE AIRCRAFT COMPRISING THE AIRCRAFT COMMUNICATION   │
│ SYSTEM WILL NOT LAND AT AN AIRPORT COMPRISING THE SELECTED AIRPORT  │
│ COMMUNICATION SYSTEM BASED ON A CHANGE IN A PLANNED AIRPORT         │
│ DESTINATIONS FOR THE AIRCRAFT                                       │
│ 800                                                                 │
└─────────────────────────────────────────────────────────────────────┘
                                   │
                                   ▼
┌─────────────────────────────────────────────────────────────────────┐
│ DETERMINE AN AVAILABILITY OF RADIO RESOURCES AT A DIFFERENT AIRPORT │
│ COMMUNICATION SYSTEM OF THE MULTIPLE AIRPORT COMMUNICATION SYSTEMS  │
│ AT ANOTHER AIRPORT BASED ON THE CHANGE IN PLANNED AIRPORT DESTINATIONS│
│ FOR THE AIRCRAFT RESPONSIVE TO DETERMINING THAT THE AIRCRAFT COMPRISING│
│ THE AIRCRAFT COMMUNICATION SYSTEM WILL NOT LAND AT THE AIRPORT      │
│ 802                                                                 │
└─────────────────────────────────────────────────────────────────────┘
                                   │
                                   ▼
┌─────────────────────────────────────────────────────────────────────┐
│ RESERVE AN AMOUNT OF RADIO RESOURCES AT THE DIFFERENT AIRPORT       │
│ COMMUNICATION SYSTEM BASED ON THE AVAILABILITY OF THE RADIO RESOURCES│
│ AT THE DIFFERENT AIRPORT COMMUNICATION SYSTEM DURING A COMBINATION OF│
│ A DATE AND TIME RANGE WHEN THE AIRCRAFT IS ANTICIPATED TO BE LOCATED AT│
│ THE OTHER AIRPORT                                                   │
│ 804                                                                 │
└─────────────────────────────────────────────────────────────────────┘
```

FIG. 8

SYSTEMS AND METHODS OF MANAGING RADIO RESOURCES OF AN AIRPORT COMMUNICATION SYSTEM

TECHNICAL FIELD

The present disclosure relates generally to management of radio resources at airports. More specifically, the present disclosure describes systems and methods of managing radio resources of an airport communication system servicing an airport.

BACKGROUND

Many commercial aircrafts include an in-flight entertainment (IFE) system as part of the aircraft's communication system. The IFE system may receive, store, utilize and generate large amounts of data, such as entertainment content (e.g., movies and video games), beverage and food purchase history information, passenger information, and the like. Airlines operating commercial aircraft may desire to either update the entertainment content of the IFE system and/or download the data generated by the IFE system.

Airlines operating the aircrafts have access to multiple means of communication for airport surface operations, including WIFI at the gate and public cellular networks. For example, FIG. 12 illustrates an example airport in which many aircraft have access to a public cellular network 1200 and WIFI network 1204, in which access points are usually located at the gate. However, those systems are shared and do not provide sufficient bandwidth to download or upload important bulks of data. As an example, for the airlines using wireless ground connectivity, it may in some scenarios take multiple weeks to transmit IFE content updates opportunistically at the gate. 5G cellular systems will increase the data rate but with still relative low bandwidth limitations to transmitting large bulk of data as the resources of those networks are shared with other wireless equipment outside of the airport environment.

Since the current system works in an opportunistic manner, trying to transfer data when connectivity is available typically results in that large bulks of data are generally fragmented into multiple files for transmission at different airports or at different moments during a certain period of time. Those transmissions are not guaranteed, and it is difficult for the airlines operating aircraft transporting the aircraft communication systems to plan the data transfer in a controlled, predictable, and efficient manner.

Therefore, there exists an unmet need in the art for methods and systems to provide an aircraft communication system sufficient bandwidth to transfer data in a non-opportunistic manner when an aircraft comprising the aircraft communication system lands at an airport.

SUMMARY

According to some embodiments of the present disclosure, a method performed by a radio resource management system in communication with multiple airport communication systems located at different airports is described. The method includes receiving a request to transfer data from an aircraft communication system within an aircraft to an airport communication system of the multiple airport communication systems. The method also includes determining an availability of radio resources at each airport communication system of the multiple airport communication systems based on the request. The method also includes selecting an airport communication system from the multiple airport communication systems to transfer the data based on the determined availability of radio resources at the airport communication system. The method further includes reserving an amount of radio resources of the selected airport communication system of the multiple airport communication systems for the aircraft communication system to transfer the data.

According to some other embodiments of the present disclosure, a radio resource management system in communication with multiple airport communication systems located at different airports is described. The radio resource management system comprises an interface that operates to communicate the multiple ground communication systems. The airport radio resource management system also comprises a processor and a memory that comprises executable instructions that when executed by the processor cause the processor to operate to receive a request to transfer data from an aircraft communication system within an aircraft to an airport communication system of the multiple airport communication systems. The operations also determine an availability of radio resources at each airport communication system of the multiple airport communication systems based on the request. The operations also select an airport communication system from the multiple airport communication systems to transfer the data based on the determined availability of radio resources at the airport communication system. The operations further reserve an amount of radio resources of the selected airport communication system of the multiple airport communication systems to transfer the data.

According to some other embodiments of the present disclosure, a computer program product comprised on a non-transitory computer readable medium is described. The computer program product includes executable instructions that when executed by a processor of a radio resource management system in communication with multiple airport communication systems located at different airports, causes the processor to operate to receive a request to transfer data from an aircraft communication system within an aircraft to an airport communication system of the multiple airport communication systems. The operations also determine an availability of radio resources at each airport communication system of the multiple airport communication systems based on the request. The operations also select an airport communication system from the multiple airport communication systems to transfer the data based on the determined availability of radio resources at the airport communication systems. The operations further reserve an amount of radio resources of the selected airport communication system of the multiple airport communication systems for the aircraft communication system to transfer the data.

Embodiments of the systems and methods described herein deliver bandwidth to an aircraft and airport users based on a reservation of the radio resources available at an airport. These embodiments can enable airlines to take control of the transfer of their data by reserving a time slot to connect to the ground infrastructure (e.g. cellular network) with the access to an important allocation of bandwidth (or full grant of the network capability) during a short period of time while the aircraft remains within terrestrial communication range of airport communication systems and infrastructure. These embodiments may allow radio resources of a communication systems and infrastructure of an airport to be utilized in the more efficient way. In addition, these embodiments may result in reduced cost of operating of airport communication systems through operation of the advance planning of the radio resources of the airport communication systems.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

The accompanying drawings, which are incorporated into and constitute a part of this specification, illustrate one or more example aspects of the invention and, together with the detailed description, serve to explain their principles and implementations.

FIG. 5 is a flowchart illustrating a method of selecting the airport communication systems from the multiple airport communication systems to transfer the data based on the determined availability of radio resources at the selected airport and the resource cost metric associated with the selected airport communication system in accordance with embodiments of the present disclosure;

FIG. 8 is a flowchart illustrating a method of reserving an amount of radio resources at the different airport communication system based on the availability of the radio resources at the different airport communication system during a combination of a date and time range when the aircraft is anticipated to be located at the other airport in accordance with embodiments of the present disclosure;

DETAILED DESCRIPTION

Figure 1:
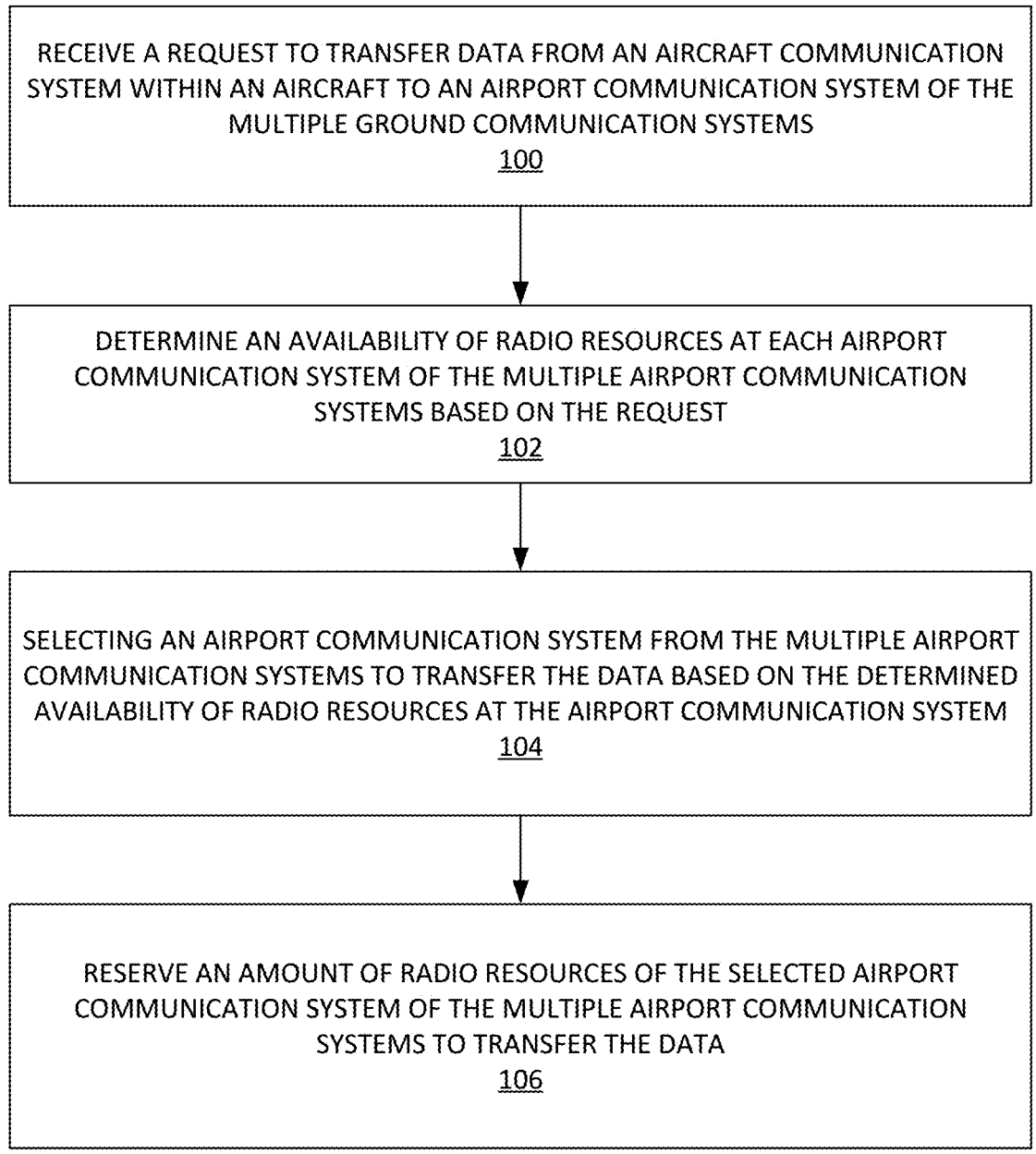
FIG. 1 is a flowchart illustrating a method performed by a radio resource management system in communication with multiple airport communication systems in accordance with embodiments of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various approaches for operating an airport resource management system will now be described with reference to various system, methods, and computer program products. These system, methods, and computer program products will be described in the following detailed description and illustrated in the accompanying drawings by various blocks, modules, components, circuits, steps, processes, algorithms, etc. (collectively referred to as "elements"). These elements may be implemented using electronic hardware, computer software stored in a non-transitory computer-readable medium, or any combination thereof. Whether such elements are implemented as hardware or software stored in a non-transitory medium depends upon the particular application and design constraints imposed on the overall implementation.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, discrete radio frequency (RF) circuits, and other suitable hardware configured to perform the various functionality described throughout this disclosure. One or more processors in the processing system may execute software. Software shall be construed broadly to include instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a non-transitory computer-readable medium. A computer-readable medium may be any available medium that is able to be electronically accessed by a computer. By way of example, and not limitation, such computer-readable medium can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that may be used to carry or store desired program code in the form of instructions or data structures and that may be accessed by a computer. Disk and disc, as used herein, include CD, laser disc, optical disc, digital versatile disc (DVD), and floppy disk, where disks usually reproduce data magnetically, while discs reproduce data optically with lasers. Combinations of the above should also be included within the scope of a non-transitory computer-readable medium.

Figure 2:
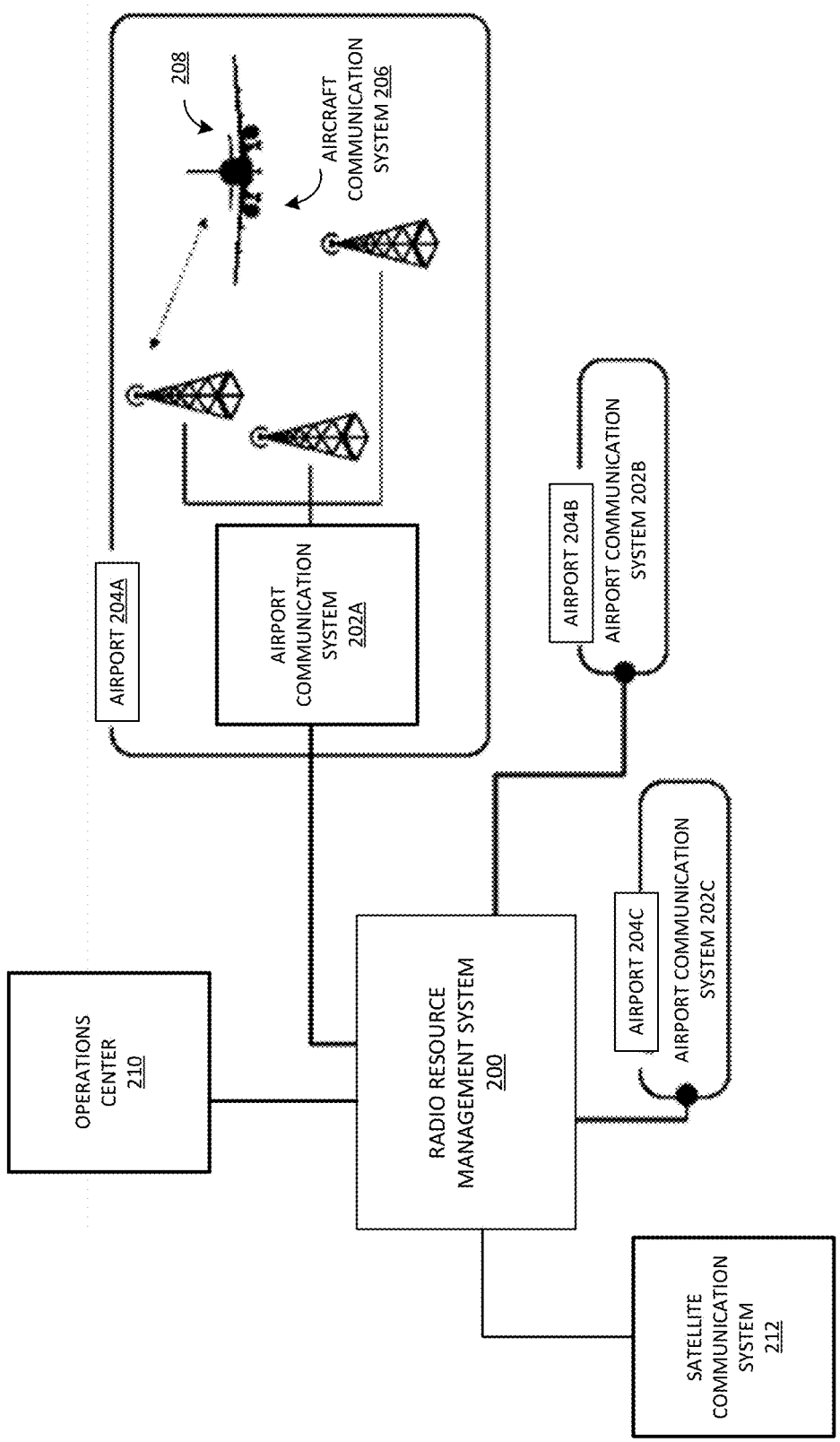
FIG. 2. is a system diagram illustrating an example radio resource management system in communication with multiple airport communication systems in accordance with embodiments of the present disclosure.

In accordance with embodiments of the present disclosure, FIG. 1 illustrates a method performed by a radio resource management system in communication with multiple airport communication systems located at different airports is disclosed. For example, FIG. 2 illustrates an example radio resource management system (RRMS) 200 in communication with multiple airport communication systems 202A-202C servicing airports 204A-C respectively. Details with regards to the elements and operations of RRMS 200 and airport communication system 202 are discussed with regards to FIG. 11 below. FIG. 1 also illustrates the method includes receiving 100 a request to transfer data from an aircraft communication system within an aircraft to an airport communication system of the multiple airport communication systems. For example, RRMS 200 may receive a request to transfer data from aircraft communication system 206 within aircraft 208 to airport communication system 202A. In some embodiments, the radio resource management system may receive the request from an operations center of an airline communication system that communicates with the aircraft communication system. For example, FIG. 2 illustrates that RRMS 200 may receive the request from operations center 210.

FIG. 1 also illustrates the method includes determining 102 an availability of radio resources at each airport communication system of the multiple airport communication systems based on the request. For example, RRMS 200 shown in FIG. 2 may determine an availability of radio resources at each airport communication system 202A-204C based on the request. The request may include information identifying one or more of a size of the data to be transferred from the aircraft communication system to an airport communication system, an estimated duration of time required to transfer the data to an airport communication system, and an amount of time the aircraft is anticipated to remain at the airport location, which is serviced by an airport communication system. The method may include determining the availability of the radio resources at each airport communication system based on such information included in the request.

The method may include determining the availability of radio resources at each airport communication system based on one or more of a communication capacity of each airport communication system, aircraft traffic at an airport serviced by each airport communication system, the physical location of the airport serviced by each airport communication system, an amount of guaranteed bandwidth for air traffic control communications at each airport communication system, and the number and/or types of radio resource reservations currently reserved at each airport communication system. For example, FIG. 2 illustrates RRMS 200 may determine the availability of radio resources at airport communication system 202A based on one or more of a communication capacity of airport communication system 202A, aircraft traffic at airport 204A serviced by airport communication system 202A, the physical location of airport 204A serviced by airport communication system 202A, an amount of guaranteed bandwidth for air traffic control communications at airport communication system 202A, and the number and/or types of radio resource reservations currently reserved at airport communication system 202A.

Figure 3:
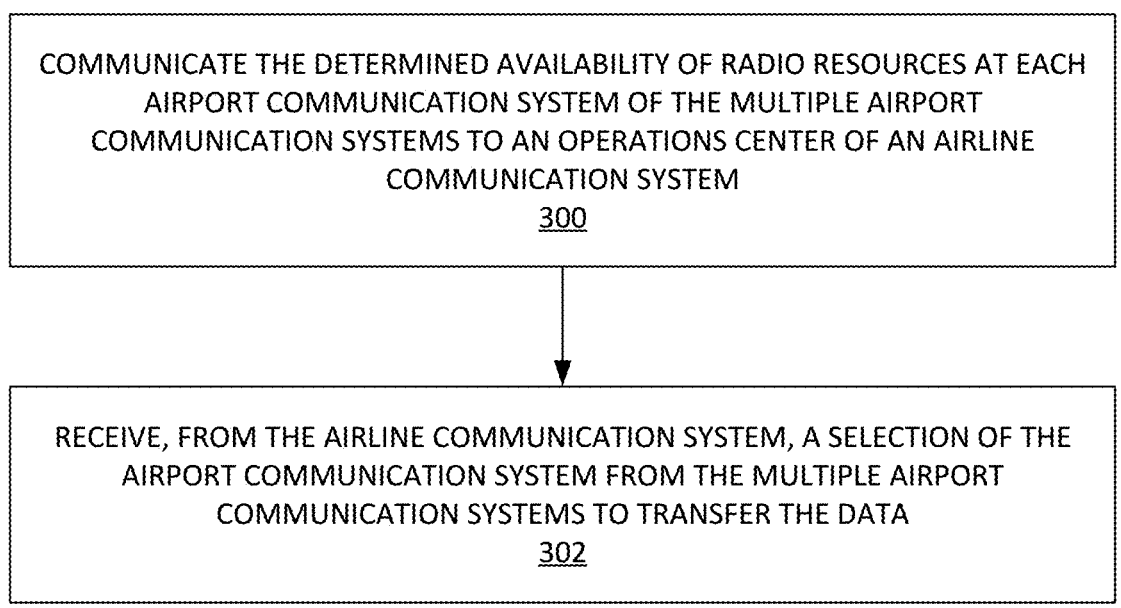
FIG. 3 is a flowchart illustrating a method of receiving a selection of the airport communication system form the multiple airport communication systems to transfer the data from an airline communication system in accordance with embodiments of the present disclosure.

Returning to FIG. 1, the method includes selecting 104 an airport communication system from the multiple airport communication systems to transfer the data based on the determined availability of radio resources at the airport communication system. For example, RRMS 200 illustrated in FIG. 2 may select airport communication system 202A from airport communication systems 202A-202C based on the determined availability of radio resources at airport communication 202A. FIG. 3 illustrates the method may include communicating 300 the determined availability of radio resources at each airport communication system of the multiple airport communications to an operations center of an airline communication system in accordance with embodiments. For example, RRMS 200 illustrated in FIG. 2 may communicate the determined availability of radio resources at each airport communication systems 202A-202C to operations center 210.

FIG. 3 further illustrates the method may include receiving 302, from the airline communications system, a selection of the airport communication system from the multiple airport communication systems to transfer the data. For example, RRMS 200 illustrated in FIG. 2 may receive, from operations center 210 of an airline communication system, a selection of airport communication system 202A to transfer the data.

Returning to FIG. 1, the method includes reserving 106 an amount of radio resources of the selected airport communication system of the multiple airport communication systems to transfer the data. For example, RRMS 200 illustrated in FIG. 2 may reserve an amount of radio resources of airport communication system 202A to transfer the data. In some embodiments, reserving the amount of radio resources comprises reserving the amount of radio resources of the selected airport communication system further based on at least one of a size of the data to be transferred from the aircraft communication system to the selected airport communication system, a duration of time required to transfer the data to the selected airport communication system, and an amount of time the aircraft is anticipated to remain at an airport location, which is serviced by the selected airport communication system, during which the data can be transferred to the airport communication system. For example, RRMS 200 may reserve the amount of radio resources based on at least one of a size of the data to be transferred from aircraft communication system 206 to the airport communication system 202A, an estimated duration of time required to transfer the data to airport communication system 202A, and an amount of time aircraft 208 comprising aircraft communication system 206 is anticipated to remain at airport 204A, which is serviced by airport communication system 202A.

FIG. 2 further illustrates that RRMS 200 may communicate with a satellite communication system 212. In this example, aircraft communication system 206 may communicate with satellite communication system 212 during flight or when located at one or more of airport communication systems 202A-202C. In an embodiment, RRMS 200 may determine an availability of radio resources at satellite communication system 212 also servicing one or more airports 202A-202C based on the request. In this embodiment, RRMS 200 may select satellite communication system 212 based on the determined availability of radio resources at satellite communication system 212 and reserve an amount of radio resources of satellite communication system 212 servicing one or more airports 202A-202C for the aircraft communication system to transfer the data.

Figure 4:
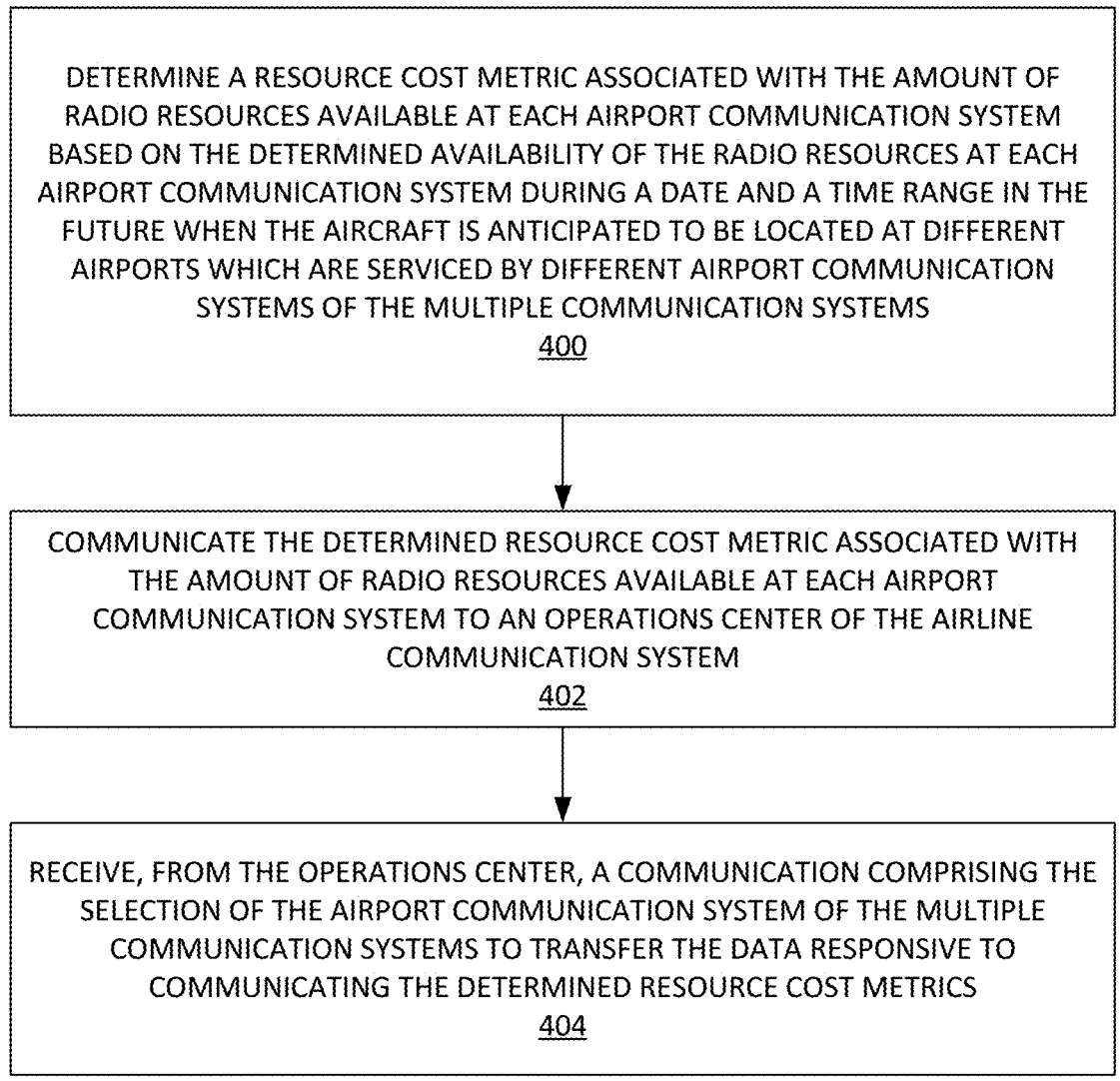
FIG. 4 is flowchart illustrating a method of determining a resource cost metric associated with the amount of radio resources available at each airport communication system based on the determined availability of the radio resources at each airport communication system during a date and time range in the future when the aircraft is anticipated to be located at different airport which are serviced by different airport communication systems of the multiple communication systems in accordance with embodiments of the present disclosure.

FIG. 4 illustrates that in some embodiments, determining the availability of radio resources at each airport communication system may include determining 400 a resource cost metric associated with the amount of radio resources to be reserved at each airport communication system based on the determined availability of the radio resources at each airport communication system during a date and a time range in the future when the aircraft is anticipated to be located at different airports which are serviced by different airport communication systems of the multiple airport communication systems. For example, RRMS 200 illustrated in FIG. 2 may determine a resource cost metric associated with the amount of radio resources to be reserved at airport communication systems 202A-202C based on the determined availability of the radio resources at airport communication systems 202A-202C during a date and a time range in the future when aircraft 208 comprising aircraft communication system 206 is anticipated to be located at airports 204A, 204B, and 204C which is serviced by airport communication systems 202A-202C respectively. As an example, RRMS 200 may determine a resource cost metric associated with the requested available bandwidth at airport 204A on a future Monday from 4:00 pm-6:00 pm EST when aircraft 208 transporting aircraft communication system 206 is anticipated to be located at airport 204A.

FIG. 4 also illustrates that the method may include communicating 402 the determined resource cost metrics associated with the amount of radio resources available at each airport communication system to an operations center of an airline communication system. Continuing the above example, ARRMS 200 may communicate the determined resource cost metrics associated with the amount of radio resources available at airport communication systems 202A-202C to operations center 210 of an airline communication system. The airline communication system is typically operated by an airline that owns and operates the aircraft transporting the aircraft communication system.

FIG. 4 further illustrates the method may include receiving 304, from the operations center, a communication comprising the selection of the airport communication system of the multiple communication systems to transfer the data responsive to communicating the determined resource cost metrics. Continuing the above example, RRMS 200 may receive, from operations center 210, comprising the selection of airport communication system 202A to transfer the data responsive to communicating the determined resource cost metrics.

In some other embodiments, FIG. 5 illustrates determining 500 a resource cost metric similarly as shown in step 400 of FIG. 4. In contrast to FIG. 4, FIG. 5 illustrates the radio resource management system selecting the airport communication system from the multiple communication systems to transfer the data based on the determined availability of radio resources at the selected airport and the resource cost metric associated with the selected airport communication system. For example, RRMS 200 may select airport communication system 202A to transfer the data based on the determine availability of radio resources at airport communication system 202A and the resource cost metric associated with available radio resources of airport communication system 202A.

A situation may arise such that the data to be transferred increases in size unexpectedly, so the initial reservation of radio resources becomes unsuitable to transfer the data. In another example, the selected airport communication system may experience technical difficulties that result in the radio resources at the airport communication system to be to unavailable or limited to essential communication services only. In either situation, or similar ones, it would be beneficial to arrange another reservation at a different airport to provide the aircraft communication system the opportunity to transfer the data.

Figure 6:
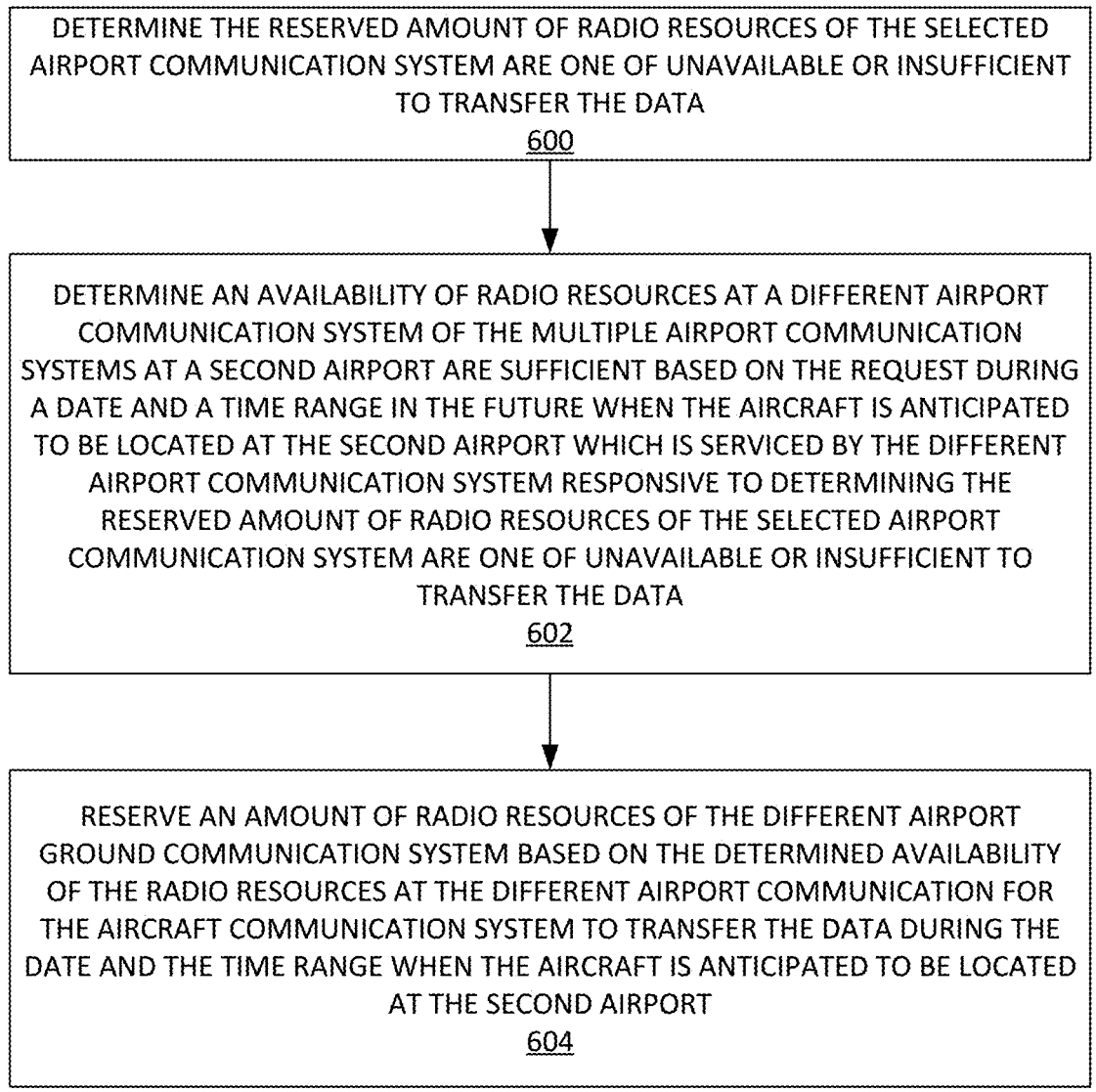
FIG. 6 is a flowchart illustrating a method of reserving an amount of radio resources of the different airport communication system based on the determined availability of the radio resources at the different airport communication for the aircraft communication system to transfer the data during the date and the time range when the aircraft is anticipated to be located at the second airport in accordance with embodiments of the present disclosure.

To overcome the above technical problems, FIG. 6 illustrates the method may include determining 600 the reserved amount of radio resources of the selected airport communication system are one of unavailable or insufficient to transfer the data. For example, RRMS 200 may determine the reserved amount of radio resources at airport communication system 202A are unavailable. The method may also include determining 602 an availability of radio resources at a different airport communication system of the multiple airport communication systems at a second airport are sufficient based on the request during a date and a time range in the future when the aircraft is anticipated to be located at the second airport which is serviced by the different airport communication system responsive to determining the reserved amount of radio resources of the selected airport communication system are one of unavailable or insufficient to transfer the data as shown in FIG. 6. For example, ARRMS 200 may determine determining 602 an availability of radio resources at airport communication system 202B are sufficient based on the request during a date and a time range in the future when the aircraft is anticipated to be located at airport 204B which is serviced by airport communication system 202B. The method may also include determining the availability of radio resources at the different airport communication system based on one or more of a communication capacity of the different airport communication system, aircraft traffic at an airport serviced by the different airport communication system, the physical location of the airport serviced by the different airport communication system, an amount of guaranteed bandwidth for air traffic control communications at the different airport communication system, and the number and/or types of radio resource reservations currently reserved at the different airport communication system.

Returning to FIG. 6, the method may include reserving 604 an amount of radio resources of the different airport communication system based on the determined availability of the radio resources at the different airport communication system for the aircraft communication system to transfer the data during the date and a time range in the future when the aircraft is anticipated to be located at the second airport. Continuing the above example, RRMS 200 may reserve an amount of radio resources of airport communication system 202B based on the determined availability of the radio resources at airport communication system 202B for aircraft communication system 206 to transfer the data during the date and a time range in the future when aircraft 208 is anticipated to be located at airport 204B which is serviced by airport communication system 202B.

The method may also include determining the availability of radio resources at the different airport communication system are sufficient based on the request comprises determining availability of radio resources that remain after other reservations of radio resources of the different airport communication system for use by other aircraft communication systems during the date and the time range when the aircraft is anticipated to be located at the second airport are sufficient. For example, RRMS 200 may determine the availability of radio resources at airport 202B are sufficient based on the request by determining the availability of radio resources that remain after other reservations of radio resources of airport 202B for use by other aircraft communication systems during the date and the time range when aircraft 208 is anticipated to be located at airport 202B are sufficient.

The method may also include determining the availability of radio resources at each airport communication system by determining an estimated amount of time that an aircraft transporting the aircraft communication system will be located at different airports serviced by the different airport communication systems of the multiple airport communication systems based on an estimated arrival time of the aircraft at the different airports and an estimated departure time of the aircraft at the different airports. For example, RRMS 200 of FIG. 2 may determine an estimated amount of time that aircraft 208 transporting aircraft communication system 206 will be located at airports 204A-C serviced by the airport communication systems 202A-C respectively based on an estimated arrival time of aircraft 208 at airports 204A-C and an estimated departure time of aircraft 208 at airports 204A-C.

Figure 7:
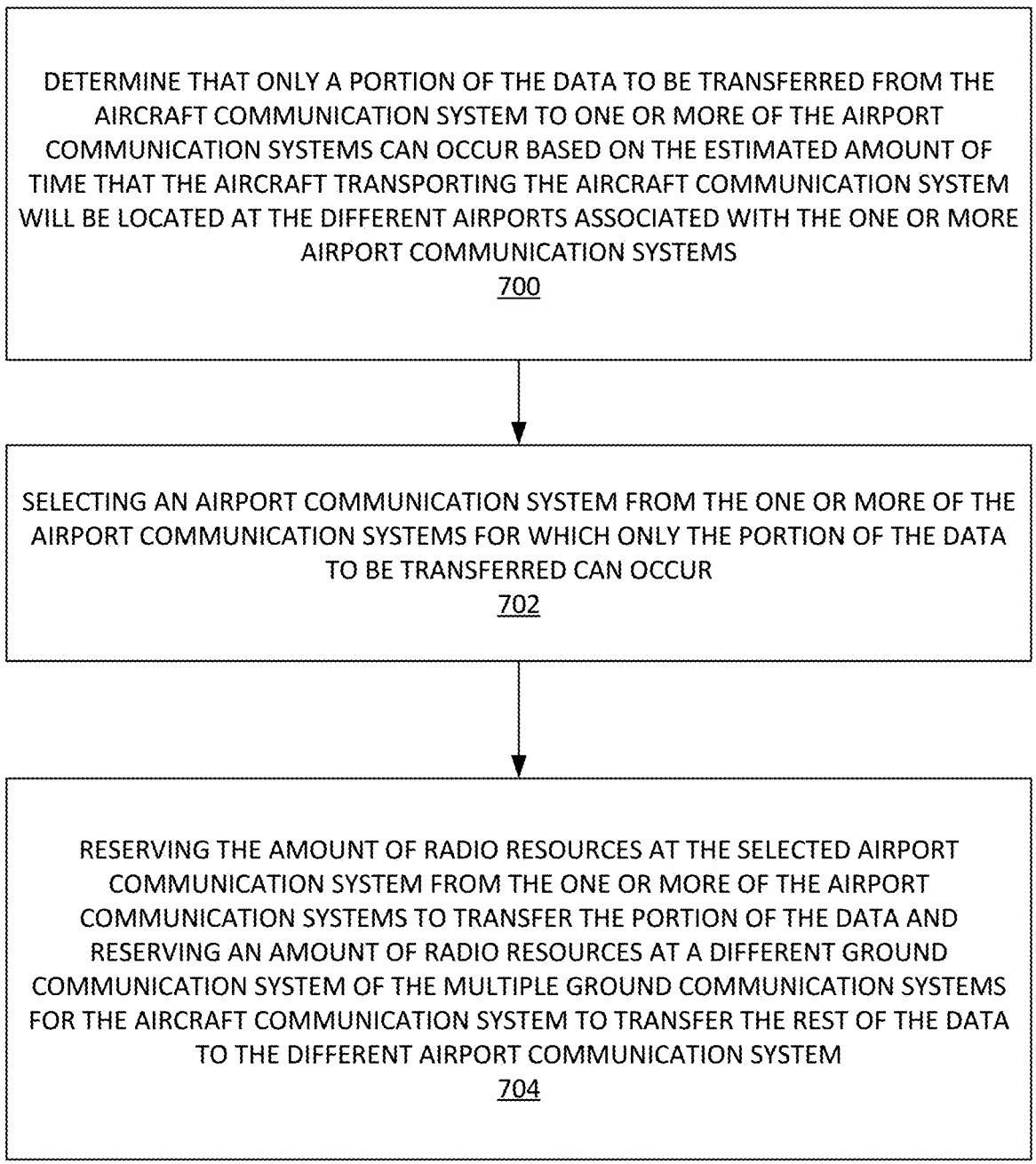
FIG. 7 is a flowchart illustrating a method of reserving the amount of radio resources at the selected airport communication system from the one or more of the airport communication systems to transfer the portion of the data and reserving an amount of radio resources at a different ground communication system of the multiple ground communication systems for the aircraft communication system to transfer the rest of the data to the different airport accordance with embodiments of the present disclosure.

FIG. 7 illustrates determining the availability of radio resources at each airport communication system may include determining 700 that only a portion of the data to be transferred from the aircraft communication system to one or more airport communication systems can occur based on the estimated amount of time that the aircraft transporting the aircraft communication system will be located at the different airports associated with the one or more airport communication systems. Continuing the above example, RRMS 200 may determine that only a portion of the data to be transferred from aircraft communication system 206 to airport communication system 202A can occur based on the estimated amount of time that aircraft 208 transporting aircraft communication system 206 will be located at airport 204A. In some situations, an airport communication system of an airport may have enough radio resources to transfer all of the data stored on an aircraft communication system, but not in the time period that the aircraft will be at the airport. In such situations, it may be beneficial to partially transfer the data to take advantage of the available radio resources, even if a full transfer of the data is not feasible. For example, a partial transfer may be desired if a substantial portion of the data can be transferred and the cost of utilizing radio resources at airport 204A is more cost-effective than airports 204B-C.

FIG. 7 also the method may also include selecting 702 an airport communication system from the one or more of the airport communication systems for which only the portion of the data to be transferred can occur. For example, RRMS 200 may select airport communication system 202A for which only the portion of the data to be transferred can occur. As discussed above, the RRMS 200 may select airport communication system 202A if the cost of utilizing radio resources at airport 204A is more cost-effective than airports 204B-C, even if only a partial data transfer can occur.

The method may also include reserving 704 the amount of radio resources at the selected airport communication system from the one or more aircraft communication systems to transfer the portion of the data and reserving an amount of radio resources at a different ground communication system of the multiple airport communication systems for the aircraft communication system to transfer the rest of the data to the different airport communication systems. Continuing the above example, ARRMS 200 may reserve the amount of radio resources at airport communication system 202A for aircraft communication system 206 to transfer the portion of the data to airport communication system 202A. RRMS 200 may also reserve an amount of radio resources at airport communication system 202C transfer the rest of the data to airport communication system 202C.

As discussed above, splitting up the transfer of the data between different airports may provide cost benefits to airlines operating the aircraft as well. For example, a planned flight schedule for an aircraft may list the aircraft as arriving at a first airport associated with radio resources that have a low utilization cost and then arriving at a second airport associated with radio resources that have a higher utilization cost. Although the aircraft may not be located at the first airport long enough to fully transfer the data, an airline operating the aircraft may decide to partially upload the data to take advantage of the lower utilization cost.

In accordance with some embodiments, the method may include determining that an arrival time of the aircraft transporting the aircraft communication system at an airport comprising the ground communication system has changed. For example, RRMS 200 may determine that an arrival time of aircraft 208 transporting aircraft communication system 202 at airport 204A comprising airport communication system 202A has changed. The method may include reconfiguring the reservation of the amount of radio resources at the airport communication system based on the determination that the arrival time of the aircraft at the airport has changed. In this example, RRMS 200 may reconfigure the reservation of the amount of radio resources at airport communication system 202A based on the determination that the arrival time of aircraft 208 at the airport 202A has changed.

Thus, RRMS 200 may dynamically adjust the reservation of resources for aircraft communication system 206 to provide higher priority of access during the adjusted timeframe it can be served by airport communication system 202A and, if insufficient resources will be available, may identify and reserve resources of another airport communication system that is located at another airport that is scheduled to be visited by the aircraft 208. Moreover, when the aircraft 208 has a delayed arrival, resources that had been scheduled for use by the aircraft communication system 206 can be unreserved and made available for reservation and subsequent use by another aircraft communication system of another aircraft that is anticipated to be located within the communication service area of airport communication system 202A and to have a resource need during the date and timeframe that the aircraft 208 has the delayed arrival to airport 202A.

FIG. 8 illustrates the method may include determining 800 that the aircraft comprising the aircraft communication system will not land at an airport comprising the airport communication system based on a change in planned airport destinations for the aircraft. For example, RRMS 200 may determine that aircraft 208 comprising aircraft communication system 206 will not land airport 204A comprising the airport communication system 202A based on a change in planned airport destinations for aircraft 208. The RRMS 200 can responsively unreserve and make available the previously reserved resources of the aircraft communication system, for reservation and subsequent use by another aircraft communication system of another aircraft.

FIG. 8 also illustrates the method may include determining 802 an availability of radio resources at a different airport communication system of the multiple airport communication systems at another airport based on the change in planned airport destinations for the aircraft responsive to determining that the aircraft comprising the aircraft communication system will not land at the airport. Continuing the above example, RRMS 200 may determine an availability of radio resources at airport communication system 202B servicing airport 204B based on the change in planned airport destinations for aircraft 208 responsive to determining that aircraft 208 comprising aircraft communication system 206 will not land at airport 204A. FIG. 8 also illustrates the method may include reserving 804 an amount of radio resources at the different airport communication system based on the availability of the radio resources at the different airport communication system during a combination of a date and time range when the aircraft is anticipated to be located at the other airport. In this example, RRMS 200 may reserve an amount of radio resources at airport communication system 202B based on the availability of the radio resources at airport communication system 202B during a combination of a date and time range when aircraft 208 is anticipated to be located at airport 204B. Flight schedules are subject to change based on cancellations, weather patterns, delays, and the like. Reservations to transfer data need to be updated when flight schedules change to ensure timely transfer of the data.

In accordance with some embodiments, the method may include reserving the amount of radio resources further based on at least one of a priority associated with the data to be transferred from the aircraft communication system and a priority associated with an aircraft comprising the aircraft communication system. For example, RRMS 200 illustrated in FIG. 2 may reserve the amount of radio resources further based on at least one of a priority associated with the data to be transferred from aircraft communication system 206 and a priority associated with aircraft 208. Some aircraft communication systems may generate more data than others, such as international flights. These aircraft communications systems may have higher priority due to the higher volume of data. In other instances, an aircraft may not have had an opportunity to transfer data over a certain period of time due to the lack or insufficiency of radio resources at previous airport. Such aircraft may be associated with a higher priority to provide the aircraft communication system an opportunity to transfer data in a timely fashion.

Figure 9:
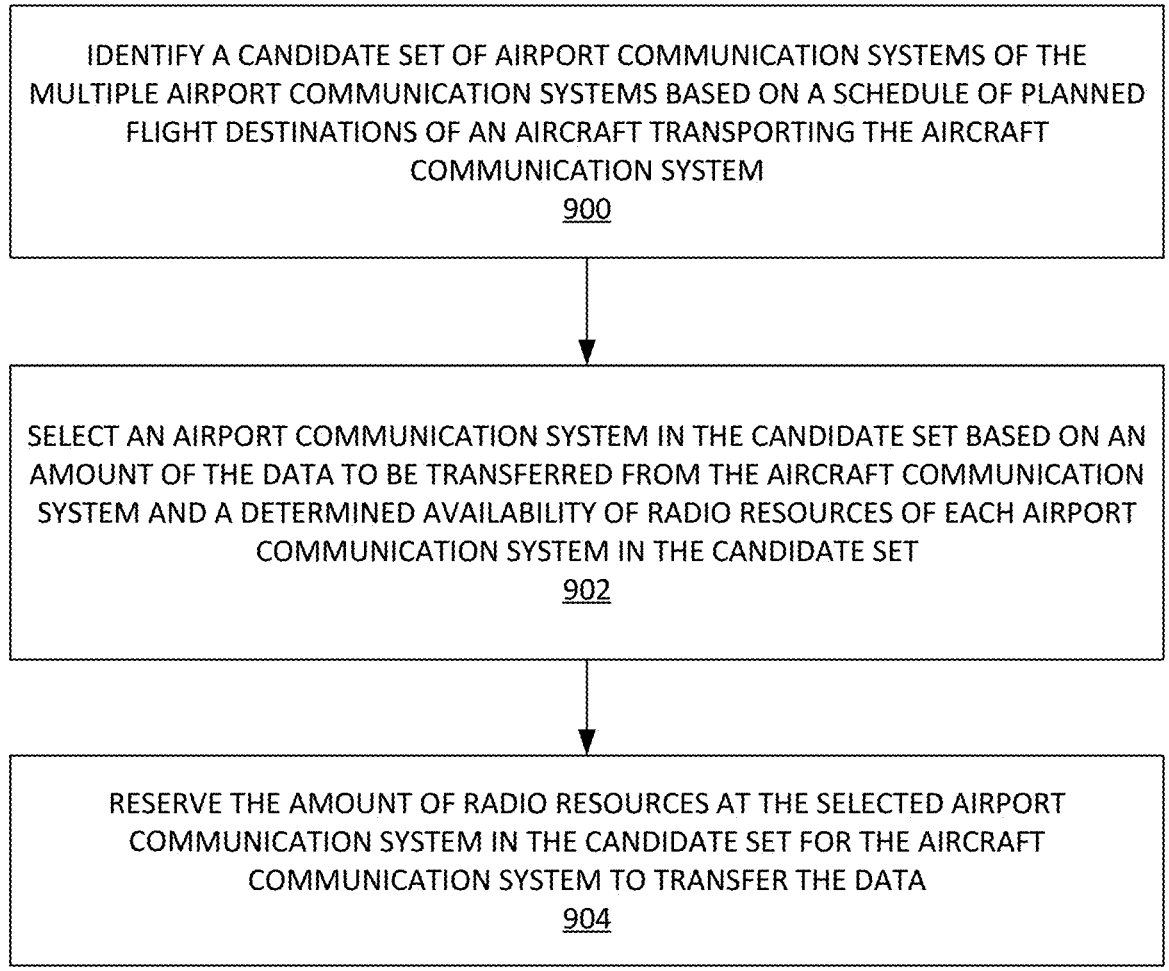
FIG. 9 is a flowchart illustrating a method of identifying a candidate set of airport communication systems of the multiple airport communication systems based on a schedule of planned flight destinations of an airport transporting the aircraft communication system in accordance with embodiments of the present disclosure.

FIG. 9 illustrates selecting the airport communication system from the multiple airport communication systems may comprise identifying 900 a candidate set of airport communication systems of the multiple airport communication systems based on a schedule of planned flight destinations of an aircraft transporting the aircraft communication system. For example, RRMS 200 illustrated in FIG. 2 may identify a candidate set of airport communication systems of the multiple ground communication systems 202A-C based on a schedule of planned flight destinations of aircraft 208 transporting aircraft communication system 206. In this example, RRMS 200 may select ground communication systems 202A and 202C as the candidate set based on the schedule of planned flight destinations of aircraft 208 including airports 204A and 204C.

FIG. 9 also illustrates the method may include selecting 902 an airport communication system in the candidate set based on an amount of the data to be transferred from the aircraft communication system and a determined availability of radio resources of each airport communication system in the candidate set. Continuing the above example, RRMS 200 may select airport communication system 202A in the candidate set of airport communication systems 202A and 202C based on an amount of the data to be transferred from aircraft communication system 206 and a determined availability of radio resources of airport communication systems 202A and 202C. For illustrative purposes, ground communication 202A may have a higher availability of radio resources than ground communication system 202C.

FIG. 9 further illustrates reserving the amount of radio resources comprises reserving 904 the amount of radio resources at the selected airport communication system in the candidate set for the aircraft communication system to transfer the data. Continuing the above example, RRMS 200 may reserve the amount of radio resources at the selected airport communication system 202A in the candidate set of airport communication systems 202A and 202C for aircraft communication system 206 to transfer the data.

The method may include determining that the transfer of the data from the aircraft communication system to the selected airport communication system does not complete before departure of the aircraft. For example, RRMS 200 shown in FIG. 2 may determine that the transfer of the data from aircraft communication system 202A to airport communication system 202A does not complete before departure of aircraft 208 from airport 204A. The method may further include reserving an amount of resources at a different airport communication system of the candidate set based on a determined availability of radio resources at the different airport communication system and an amount of data that could not be transferred to the selected airport communication system. In this example, RRMS 200 may reserve an amount of resources at airport communication system 202C of the candidate set of airport communication systems 202A and 202C based on a determined availability of radio resources at airport communication system 202C and an amount of data that could not be transferred to airport communication system 202A. Technical difficulties, weather-related issues, radio interference, a higher than expected volume of data and the like may arise and prevent the full transfer of the data as planned. The solution described offers a dynamic ability to reserved additional radio resources to enable the transfer data even when unforeseen issues arise.

Figure 10:
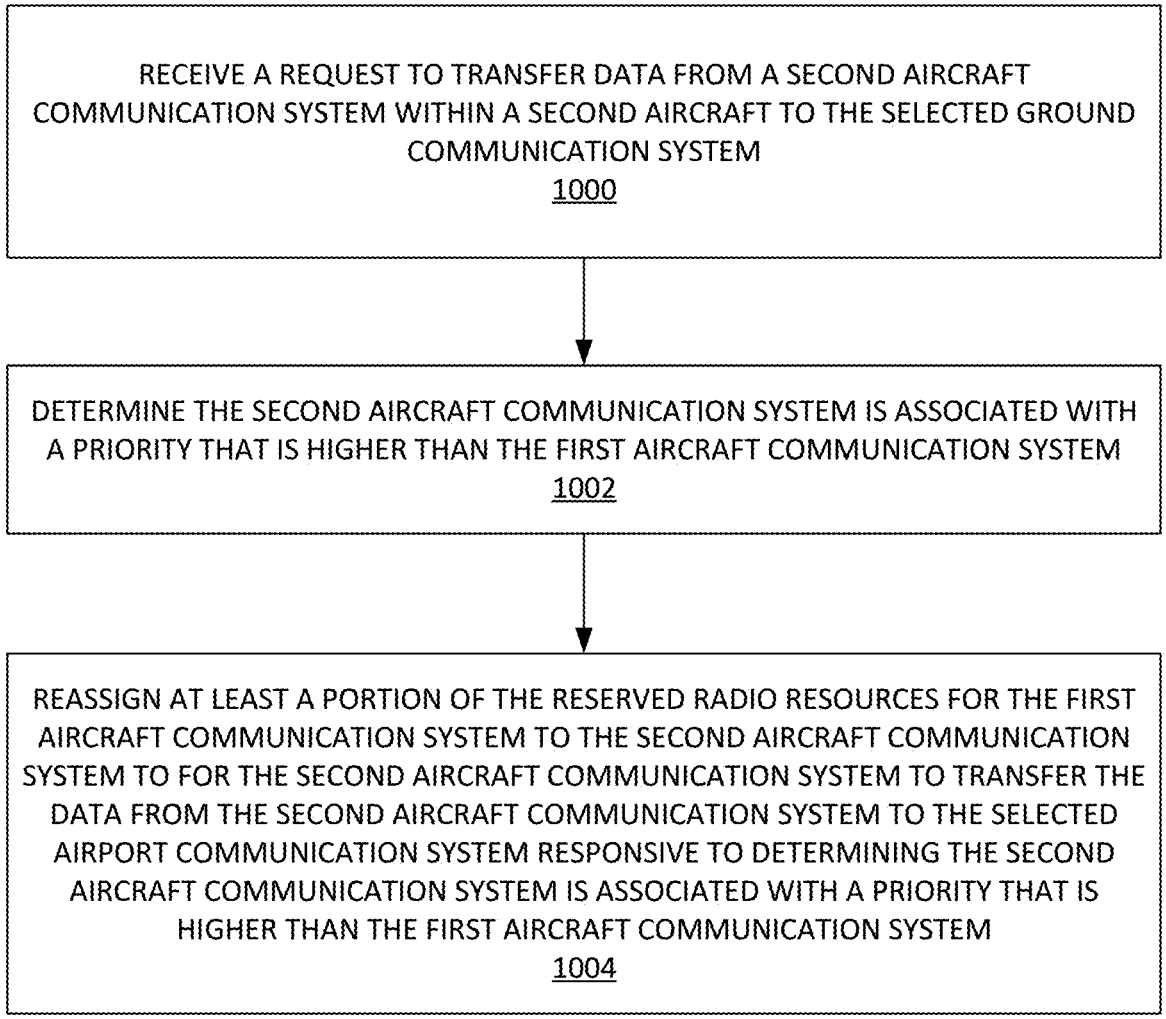
FIG. 10 is a flowchart illustrating a method of reassigning at least a portion of reserved radio resources for a first aircraft communication system to a second aircraft communication system to for the second aircraft communication system to transfer data from the second aircraft communication system to the selected airport communication system responsive to determining the second aircraft communication system is associated with a priority that is higher than the first aircraft communication system in accordance with embodiments of the present disclosure.

In accordance with some embodiments, the aircraft communication system is a first aircraft communication system. FIG. 10 illustrates the method may include receiving 1000 a request to transfer data from a second aircraft communication system within a second aircraft to the selected airport communication system. For example, RRMS 200 illustrated in FIG. 2 may receive a request to transfer data from a second aircraft communication system (not shown) within a second aircraft (not shown) to the airport communication system 202A. Returning to FIG. 10, the method may include determining 1002 the second aircraft communication system is associated with a priority that is higher than the first aircraft communication system. Continuing the example, RRMS 200 may determine the second aircraft communication system is associated with a priority that is higher than the aircraft communication system 206.

Responsive to determining the second aircraft communication system is associated with a priority that is higher than the first aircraft communication system, FIG. 10 illustrates the method may include reassigning 1004 at least a portion of the reserved radio resources for the first aircraft communication system to the second aircraft communication system for the second aircraft communication system to transfer the data from the second aircraft communication system to the selected aircraft communication system. In this example, RRMS 200 reassigns at least a portion of the reserved radio resources for aircraft communication system 206 to the second aircraft communication system for the second aircraft communication system to transfer the data from the second aircraft communication system to airport communication system 202A.

The method may include selecting a different airport communication system in the candidate set based on the amount of the data to be transferred from the first aircraft communication system and a determined availability of radio resources at the different airport communication system of the candidate set responsive to reassigning the at least a portion of the reserved radio resources for the first aircraft communication system to the second aircraft communication system. Continuing the above example, RRMS 200 may select airport communication system 202C of the candidate set of airport communication systems 202A and 202C responsive to reassigning the at least a portion of the reserved radio resources for aircraft communication system 206 to the second aircraft communication system (not shown). The method may also include reserving an amount of radio resources at the selected different airport communication system in the candidate set for the first aircraft communication system to transfer the data. In this example, RRMS 200 may reserve an amount of radio resources at the airport communication system 202C in the candidate set of ground communication systems 202A and 202C for the aircraft communication system 206 to transfer the data.

The method may further include increasing a priority level associated with the first aircraft communication system temporarily until the transfer of the data from the first aircraft communication system has been completed responsive to reassigning the at least a portion of the reserved radio resources for the first aircraft communication system to the second aircraft communication system. Continuing the above example, RRMS 200 may increase a priority level associated with aircraft communication system 206 temporarily until the transfer of the data from aircraft communication system 206 has been completed responsive to reassigning the at least a portion of the reserved radio resources for aircraft communication system 206 to the second aircraft communication system.

Figure 11:
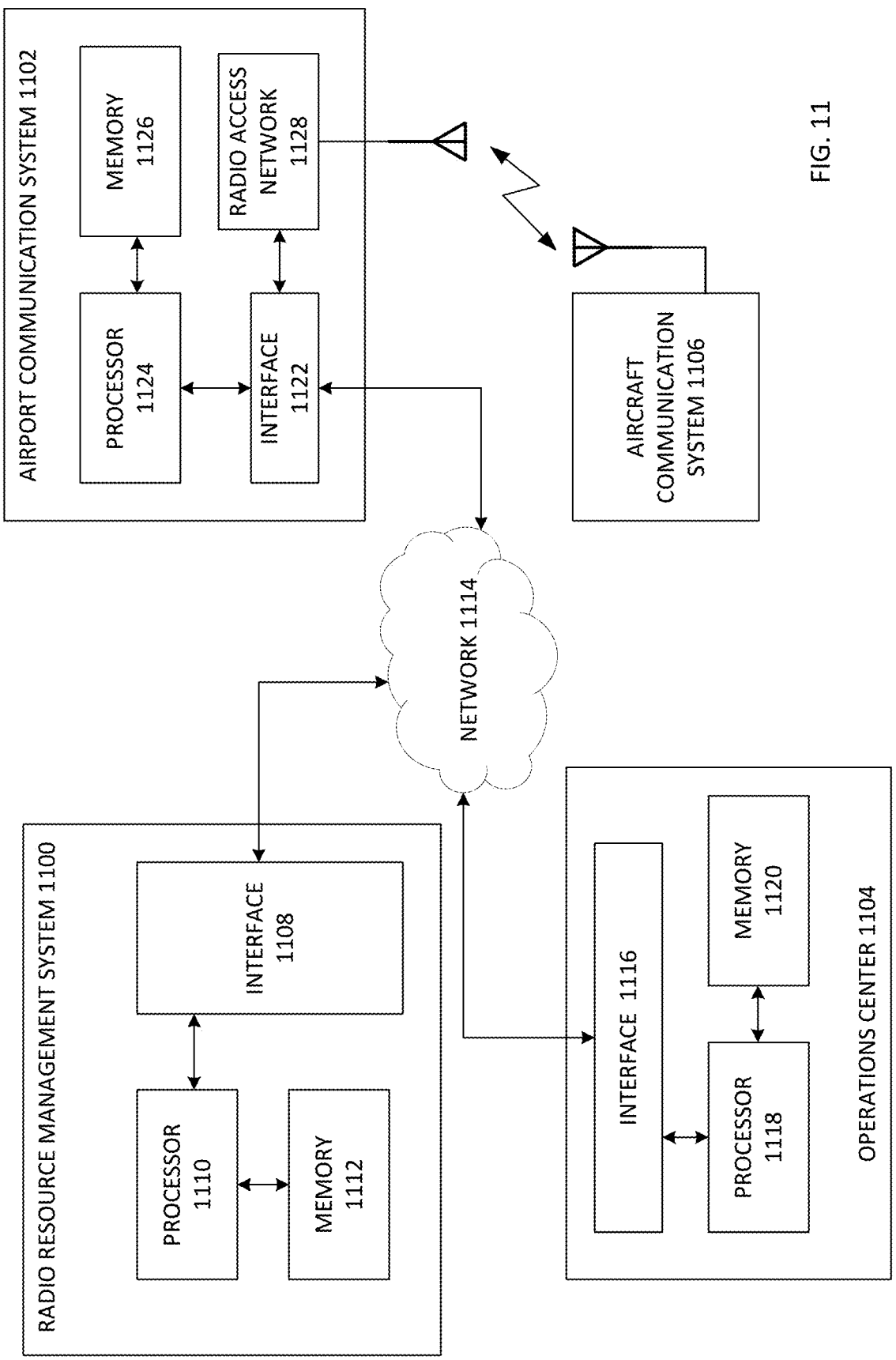
FIG. 11 is a block diagram illustrating an example radio resource management system in communication with an airport communication system and an operations center of an airline communication system in accordance with embodiments of the present disclosure.

In accordance with embodiments, a radio resource management system in communication with multiple airport communication systems located at different airports is disclosed. For example, FIG. 11 illustrates an example radio resource management system (RRMS) 1100 in communication with an airport communication system 1102, and an operations center 1104 of an airline communication system. Although FIG. 11 illustrates RRMS 1100 in communication with a single airport communication system 1102, it should be understood that RRMS 1100 communicates with multiple airport communication systems located at different airports as described above with regards to FIGS. 1 and 2.

The airport radio resource management system comprises an interface that operates to communicate with the multiple airport communication systems. Continuing the above example, FIG. 11 illustrates RRMS 1100 comprises an interface 1108 that operates to communicate with multiple airport communication systems, such as airport communication system 1102. The radio resource management system also comprises a processor and a memory comprising executable instructions that when executed by the processor cause the processor to operate to receive, via the interface, a request to transfer data from the aircraft communication system to an airport communication system of the multiple airport communication systems. In this example, FIG. 11 illustrates RRMS 1100 comprises processor 1110 and a memory 1112 that comprises executable instructions that when executed by processor 1110 cause processor 1110 to operate to receive, via interface 1108, a request to transfer data from aircraft communication system 1106 to an airport communication system of the multiple ground communication systems, such as airport communication system 1102.

As discussed above, the radio resource management system may receive the request from an airline communication system that communicates with the aircraft communication system in accordance with some embodiments. For example, RRMS 1100 may receive the request from operations center 1104 of an airline communication system over network 1114 as shown in FIG. 11. Network 1114 may comprise one or more known telecommunication networks, such as, but not limited to, Internet Protocol (IP) based networks.

The memory of radio resource management system also comprises executable instructions that when executed by the processor cause the processor to operate to determine an availability of radio resources at each airport communication system of the multiple airport communication systems based on the request. Continuing the above example, processor 1110 may operate to determine an availability of radio resources each airport communication system (such as airport communication system 1102) of the multiple airport communication systems based on the request. It should also be understood that the processor of the radio resource management system may operate to determine the availability of radio resources each airport communication system of the multiple airport communication systems in accordance with embodiments discussed above in this disclosure.

The memory of airport radio resource management system also comprises executable instructions that when executed by the processor cause the processor to operate to select an airport communication system from the multiple airport communication systems to transfer the data based on the determined availability of radio resources at the airport communication system. Continuing the above example, processor 1110 may operate to select airport communication system 1102 from the multiple airport communication systems (e.g. see FIG. 2) to transfer the data based on the determined availability of radio resources at airport communication system 1102.

The memory of airport radio resource management system further comprises executable instructions that when executed by the processor further cause the processor to operate to reserve an amount of radio resources of the selected airport communication system of the multiple airport communication systems for the aircraft communication system to transfer the data. Continuing the above example, processor 1110 may operate to reserve an amount of radio resources of selected airport communication system 1102 of the multiple airport communication systems for aircraft communication system 1106 to transfer the data. It should also be understood that the processor of the airport radio resource management system may operate to reserve the amount of radio resources of the selected airport communication system in accordance with embodiments discussed above in this disclosure.

In some embodiments, a computer program product, comprised on a non-transitory computer readable medium, includes executable instructions that when executed by a processor of a radio resource management system in communication with multiple airport communication systems located at different airports, causes the processor to operate to receive a request to transfer data from an aircraft communication system to an airport communication system of the multiple airport communication systems. The executable instructions when executed by the processor causes the processor to also operate to determine an availability of radio resources at each airport communication system of the multiple airport communication systems based on the request. The executable instructions when executed by the processor causes the processor to further operate to select an airport communication system from the multiple airport communication systems to transfer the data based on the determined availability of radio resources at the airport communication system. The executable instructions when executed by the processor causes the processor to further operate to reserve an amount of radio resources of the selected airport communication system of the multiple airport communication systems for the aircraft communication system to transfer the data.

In some embodiments, an operations center of an airline communication system comprises an interface that operates to communicate with a radio resource management system that communicates with multiple airports communication systems located at different airports. For example, FIG. 11 illustrates operations center 1104 of an aircraft comprises an interface 1116 that operates to communicate with radio resource management system 1100. The operations center also comprises a processor 1118 and memory 1120 comprising executable instructions that when executed by processor 1118 cause the processor 1118 to operate to transmit, via interface 1116, a request to transfer data from aircraft communication system 1106 to an airport communication system of the multiple airport communication systems. Operations Center 1104 may receive, via interface 116, the determined availability of radio resources at each airport communication system of the multiple airport communication systems. Memory 1120 may also comprise executable instructions that when executed by processor 1118 cause the processor 1118 to operate to present the determined availability of radio resources at each airport communication system of the multiple airport communication system on a display (not shown) of Operations Center 1104. In some embodiments, the processor 1118 to may operate to present the determined availability of radio resources and the associated resource cost metric associated with the determined availability of radio resources. As an illustrative example, a list of airports along with the availability of radio resources at the airports and the respective cost of reserving the radio resources may be presented on a display of a user terminal of the operations centers 1104.

Responsive to presenting the determined availability of radio resources, the processor 1118 may operate to receive a selection of airport communication system 1102 of the multiple airport communication systems (e.g., see FIG. 2). Continuing the above illustrative example, a user may select one of the airports to secure a reservation of the radio resources at the airport to transfer the data. Processor 1118 may further operate to communicate, to radio resource management system 1100, the selection of airport communication system 1102 to transfer the data. In some embodiments, processor 1118 may operate to communicate, to the aircraft communication system 1106, an instruction to transfer the data at the selected airport using the reserved radio resources. In some embodiments, processor 118 may operate to communicate the instruction to the aircraft communication system 1106 via network 1114 and one of the multiple airport communication systems discussed above. In some other embodiments, processor 118 may operate to communicate the instruction to the aircraft communication system 1106 via satellite communication system 212 illustrated in FIG. 2.

In accordance with embodiments, an airport communication system of airport comprises an interface that operates to communicate with an aircraft communication system within an aircraft and a radio resource management system that communicates with multiple airport communication systems located at different airports. FIG. 11 illustrates, for example, airport communication system 1102 comprises an interface 1122 that operates to communicate with aircraft communication system 1106 within an aircraft (e.g. aircraft 208 of FIG. 2) and RRMS 1100. The airport communication system also comprises a processor and a memory that comprises executable instructions that when executed by the processor cause the processor to operate to receive, from the airport radio resource management system via the interface, a communication comprising an instruction to reserve an amount of radio resources at the airport communication system for the aircraft communication system to transfer data stored in the aircraft communication system to the airport communication system. For example, FIG. 11 illustrates airport communication system 1102 comprises processor 1124 and memory 1126 that comprises executable instructions that when executed by processor 1124 cause processor 1124 to operate to receive, from RMMS 1100 via interface 1122, a communication comprising an instruction to reserve an amount of radio resources at airport communication system 1102 for aircraft communication system 1106 to transfer data stored in aircraft communication system 1106 to airport communication system 1102.

The memory also comprises executable instructions that when executed by the processor cause the processor to operate to reserve the amount of radio resources at the airport communication system based on the instruction. Continuing the above example, processor 1124 operates to reserve the amount of radio resources at airport communication system 1102 based on the instruction. In some embodiments, the processor operates to reserve the amount of radio resources of a radio access network servicing the airport communication system. For example, processor 1124 may operate to reserve the amount of radio resources of radio access network 1128 illustrated in FIG. 11. In some embodiments, the radio access network comprises a dedicated cellular communication network that comprises radio access nodes, such as, but not limited to, Wide Area Network (WAN) access nodes and Local Area Network (LAN) access nodes.

The memory also comprises executable instructions that when executed by the processor cause the processor to operate to receive, using the reserved amount of radio resources, the data stored in the aircraft communication system from the aircraft communication system. For example, processor 1124 illustrated in FIG. 11 may operate to receive, using the reserved amount of radio resources, the data stored in aircraft communication system 1106 from aircraft communication system 1106. In this example, processor 1124 may receive the data using the reserved amount of radio resources of radio access network 1128 from aircraft communication system 1106.

Figure 12:
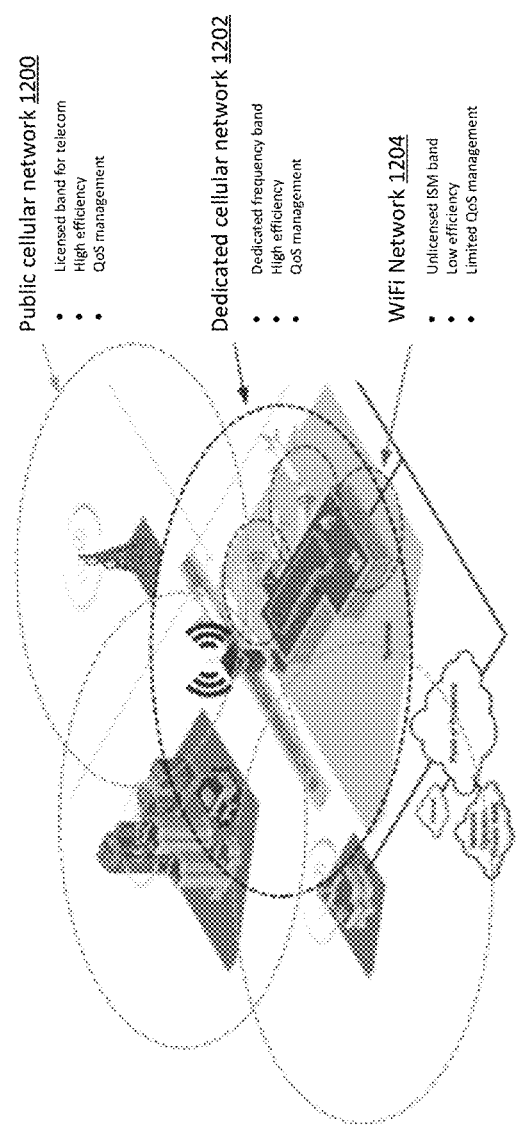
FIG. 12 is a graphic illustrating an example airport and dedicated cellular network of an airport communication system of the example airport in accordance with embodiments of the present disclosure.

The systems and methods described herein take advantage of the deployment of cellular networks that are fully or partially dedicated to Airport Surface Operations. This includes infrastructure deployed specifically for airport usage such as dedicated cellular networks (e.g. 4G) using non-telecom frequency bands and Aeronautical Mobile Airport Communication Systems (AeroMACS) or equivalent technology that is using the 5 GHz protected spectrum for safety services. For example, dedicated cellular network 1202 illustrated in FIG. 12 may utilize non-telecom frequency bands and AeroMACS or equivalent technology in the 5 GHz protected spectrum for safety services. A network slicing feature that will be deployed under the 5G umbrella should allow to control resource allocations for a dedicated zone or set of users, such as airport communications systems servicing airports described herein. For example, public cellular network 1200 may utilize a network slicing feature that will be deployed under the 5G to provide a dedicated network slice for airport communication systems covered by the public cellular network 1200.

As discussed above, some embodiments of the present disclosure are directed to a new solution to manage the resource allocations of cellular networks dedicated to airport operations based on a reservation mechanism. For example, the dedicated cellular network 1202 illustrated of FIG. 12 may be dedicated to airport operations. It is a complete change of paradigm since the current aircraft ground communication systems are operating in an opportunistic manner, trying to transfer a part of a large set of data when the aircraft has connectivity at the different airports. It can take multiple weeks to transmit all that information in a non-deterministic way. The systems and methods described herein allow for large transfer of bulk data when an aircraft needs it, ensuring that the data is delivered in a timely and efficient manner.

Various embodiments disclosed herein deliver bandwidth to the aircraft and airport users based on reservation of the radio resources. It is a complete change of paradigm, where the airlines take control of the transfer of their data by reserving, for example, a time slot and an amount of radio resources to connect to the ground communication infrastructure (e.g. cellular network) with the access to an important allocation of bandwidth (or full grant of the network capability) during a short period of time. The benefits for the airlines are to have an important bandwidth when needed to transfer large bulk of data in a fully controlled way. It is not anymore, an opportunistic approach, but a strategy completely deterministic. Thus, the systems and methods disclosed allow for the exploitation of the radio resources of the ground communication infrastructure of airports in the most efficient way.

The invention claimed is:

1. A method performed by a radio resource management system in communication with multiple airport communication systems located at different airports, the method comprising:
   receiving a request to transfer data from an aircraft communication system within an aircraft to an airport communication system of the multiple airport communication systems;
   determining an availability of radio resources at each airport communication system of the multiple airport communication systems based on the request, wherein the determining the availability of radio resources at each airport communication system comprises determining an estimated amount of time that an aircraft transporting the aircraft communication system will be located at different airports serviced by the different airport communication systems of the multiple airport communication systems based on an estimated arrival time of the aircraft at the different airports and an estimated departure time of the aircraft at the different airports;
   selecting an airport communication system from the multiple airport communication systems to transfer the data based on the determined availability of radio resources at the airport communication system; and
   reserving an amount of radio resources of the selected airport communication system of the multiple airport communication systems for the aircraft communication system to transfer the data,
   wherein determining the availability of radio resources at each airport communication system comprises:
   for each airport communication system, determining an amount of available bandwidth that will be available for the aircraft at the airport of the airport communication system based on a number of radio resources reserved to other aircraft and type of radio resources reserved to the other aircraft.

2. A computer program product comprised on a non-transitory computer readable medium, the computer program product includes executable instructions that when executed by a processor of a radio resource management system in communication with multiple airport communication systems located at different airports, causes the processor to operate to:
   receive a request to transfer data from an aircraft communication system within an aircraft to an airport communication system of the multiple airport communication systems;
   determine an availability of radio resources at each airport communication system of the multiple airport communication systems based on the request, wherein the determination of the availability of radio resources at each airport communication system comprises determining an estimated amount of time that an aircraft transporting the aircraft communication system will be located at different airports serviced by the different airport communication systems of the multiple airport communication systems based on an estimated arrival time of the aircraft at the different airports and an estimated departure time of the aircraft at the different airports;
   select an airport communication system from the multiple airport communications systems to transfer the data based on the determined availability of radio resources at the airport communication system; and reserve an amount of radio resources of the selected airport communication system of the multiple airport communication systems for the aircraft communication system to transfer the data, wherein determining the availability of radio resources at each airport communication system comprises:

for each airport communication system, determining an amount of available bandwidth that will be available for the aircraft at the airport of the airport communication system based on a number of radio resources reserved to other aircraft and type of radio resources reserved to the other aircraft.

3. A method performed by a radio resource management system in communication with multiple airport communication systems located at different airports, the method comprising:

receiving a request to transfer data from an aircraft communication system within an aircraft to an airport communication system of the multiple airport communication systems;

determining an availability of radio resources at each airport communication system of the multiple airport communication systems based on the request, wherein the determining the availability of radio resources at each airport communication system comprises determining an estimated amount of time that an aircraft transporting the aircraft communication system will be located at different airports serviced by the different airport communication systems of the multiple airport communication systems based on an estimated arrival time of the aircraft at the different airports and an estimated departure time of the aircraft at the different airports;

selecting an airport communication system from the multiple airport communication systems to transfer the data based on the determined availability of radio resources at the airport communication system; and reserving an amount of radio resources of the selected airport communication system of the multiple airport communication systems for the aircraft communication system to transfer the data, wherein determining the availability of radio resources at each airport communication system comprises determining that only a portion of the data to be transferred from the aircraft communication system to one or more of the airport communication systems can occur based on the estimated amount of time that the aircraft transporting the aircraft communication system will be located at the different airports associated with the one or more airport communication systems; and wherein selecting the airport communication system from the multiple airport communications systems comprises selecting an airport communication system from the one or more of the airport communication systems for which only the portion of the data to be transferred can occur; and wherein reserving the amount of radio resources comprises reserving the amount of radio resources at the selected airport communication system from the one or more of the airport communication systems to transfer the portion of the data and reserving an amount of radio resources at a different airport communication system of the multiple airport communication systems for the aircraft communication system to transfer the rest of the data to the different airport communication system.

4. The method of claim 3, wherein receiving the request to transfer the data comprises receiving the request from an operations center of an airline communication system.

5. The method of claim 4, wherein selecting the airport communication system from the multiple airport communication systems comprises:

communicating the determined availability of radio resources at each airport communication system of the multiple airport communication systems to the operations center of the airline communication system; and receiving, from the airline communication system, a selection of the airport communication system from the multiple airport communication system to transfer the data.

6. The method of claim 3, wherein reserving the amount of radio resources comprises reserving the amount of radio resources of the selected airport communication system is further based on an amount of time the aircraft is anticipated to remain at an airport location serviced by the selected airport communication system during which the data can be transferred to the selected airport communication system.

7. The method of claim 3, wherein determining an availability of radio resources at each airport communication system comprises determining a resource cost metric associated with radio resources available at each airport communication system based on the determined availability of the radio resources at each airport communication system during a date and a time range in the future when the aircraft is anticipated to be located at different airports which are serviced by different airport communication systems of the multiple communication systems; and wherein selecting the airport communication from the multiple airport communication systems comprises:

communicating the determined resource cost metrics associated with the amount of radio resources available at each airport communication system to an operations center of an airline communication system; and responsive to communicating the determined resource cost metrics, receiving, from the operations center, a communication comprising the selection of the airport communication system of the multiple airport communications systems to transfer the data.

8. The method of claim 3, wherein determining an availability of radio resources at each airport communication system comprises determining a resource cost metric associated with radio resources available at each airport communication system based on the determined availability of the radio resources at each airport communication system during a date and a time range in the future when the aircraft is anticipated to be located at different airports which are serviced by different airport communication systems of the multiple communication systems; and wherein selecting the airport communication from the multiple airport communication systems comprises selecting the airport communication system from the multiple airport communications systems to transfer the data based on the determined availability of radio resources at the selected airport and the resource cost metric associated with the selected airport communication system.

9. The method of claim 3, the method further comprising:

determining the reserved amount of radio resources of the selected airport communication system are one of unavailable or insufficient to transfer the data;

responsive to determining the reserved amount of radio resources of the selected airport communication system are one of unavailable or insufficient to transfer the data, determining an availability of radio resources at a different airport communication system of the multiple airport communication systems at a second airport are sufficient based on the request during a date and a time range in the future when the aircraft is anticipated to be located at the second airport which is serviced by the different airport communication system; and reserving an amount of radio resources of the different airport communication system based on the determined availability of the radio resources at the different airport communication for the aircraft communication system to transfer the data during the date and the time range when the aircraft is anticipated to be located at the second airport.

10. The method of claim 9, wherein determining the availability of radio resources at the different airport communication system are sufficient based on the request comprises determining availability of radio resources that remain after other reservations of radio resources of the different airport communication system for use by other aircraft communication systems during the date and the time range when the aircraft is anticipated to be located at the second airport.

11. The method of claim 3, the method further comprising:
determining that an arrival time of the aircraft transporting the aircraft communication system at an airport comprising the airport communication system has changed; and
reconfiguring the reservation of the amount of radio resources at the airport communication system based on the determination that the arrival time of the aircraft at the airport has changed.

12. The method of claim 3, the method further comprising:
determining that the aircraft comprising the aircraft communication system will not land at an airport comprising the selected airport communication system based on a change in planned airport destinations for the aircraft;
responsive to determining that the aircraft comprising the aircraft communication system will not land at the airport, determining an availability of radio resources at a different airport communication system of the multiple airport communication systems at another airport based on the change in planned airport destinations for the aircraft; and
reserving an amount of radio resources at the different airport communication system based on the availability of the radio resources at the different airport communication system during a combination of a date and time range when the aircraft is anticipated to be located at the other airport.

13. The method of claim 3, wherein reserving the amount of radio resources comprises reserving the amount of radio resources further based on at least one of a priority associated with the data to be transferred from aircraft communication system and a priority associated with an aircraft comprising the aircraft communication system.

14. The method of claim 3, wherein selecting the airport communication system from the multiple airport communications systems comprises:
identifying a candidate set of airport communication systems of the multiple airport communication systems based on a schedule of planned flight destinations of an aircraft transporting the aircraft communication system; and
selecting an airport communication system in the candidate set based on an amount of the data to be transferred from the aircraft communication system and a determined availability of radio resources of each airport communication system in the candidate set;
wherein reserving the amount of radio resources comprises reserving the amount of radio resources at the selected airport communication system in the candidate set for the aircraft communication system to transfer the data.

15. The method of claim 14, the method further comprising:
determining that the transfer of the data from the aircraft communication system to the selected airport communication system does not complete before departure of the aircraft; and
reserving an amount of resources at a different airport communication system of the candidate set based on a determined availability of radio resources at the different airport communication and an amount of data that could not be transferred to the selected airport communication system.

16. The method of claim 14, wherein the aircraft communication system is a first aircraft communication system; and the method further comprising:
receiving a request to transfer data from a second aircraft communication system within a second aircraft to the selected airport communication system;
determining the second aircraft communication system is associated with a priority that is higher than the first aircraft communication system; and
responsive to determining the second aircraft communication system is associated with a priority that is higher than the first aircraft communication system, reassigning at least a portion of the reserved radio resources for the first aircraft communication system to the second aircraft communication system for the second aircraft communication system to transfer the data from the second aircraft communication system to the selected airport communication system.

17. The method of claim 16, the method further comprising:
responsive to reassigning the at least a portion of the reserved radio resources for the first aircraft communication system to the second aircraft communication system, selecting a different airport communication system in the candidate set based on the amount of the data to be transferred from the first aircraft communication system and a determined availability of radio resources at the different airport communication system of the candidate set; and
reserving an amount of radio resources at the selected different airport communication system in the candidate set for the first aircraft communication system to transfer the data.

18. The method of claim 17, the method further comprising:
responsive to reassigning the at least a portion of the reserved radio resources for the first aircraft communication system to the second aircraft communication system increasing a priority level associated with the first aircraft communication system temporarily until the transfer of the data from the first aircraft communication system has been completed.

19. A radio resource management system in communication with multiple airport communication systems located at different airports, the radio resource management system comprising:
an interface that operates to communicate the multiple airport communication systems,
a processor; and
a memory comprising executable instructions that when executed by the processor cause the processor to operate to:
receive a request to transfer data from an aircraft communication system within an aircraft to an airport communication system of the multiple airport communication systems;
determine an availability of radio resources at each airport communication system of the multiple airport communication systems based on the request, wherein the determination of the availability of radio resources at each airport communication system comprises determining an estimated amount of time that an aircraft transporting the aircraft communication system will be located at different airports serviced by the different airport communication systems of the multiple airport communication systems based on an estimated arrival time of the aircraft at the different airports and an estimated departure time of the aircraft at the different airports;
select an airport communication system from the multiple airport communications systems to transfer the data based on the determined availability of radio resources at the airport communication system; and
reserve an amount of radio resources of the selected airport communication system of the multiple airport communication systems for the aircraft communication system to transfer the data,
wherein determining the availability of radio resources at each airport communication system comprises:
for each airport communication system determining an amount of available bandwidth that will be available for the aircraft at the airport of the airport communication system based on a number of radio resources reserved to other aircraft and type of radio resources reserved to the other aircraft.

20. The radio resource management system of claim 19, wherein determining the availability of radio resources at each airport communication system further comprises:
for each airport communication system determining the amount of available bandwidth that will be available for the aircraft at the airport of the airport communication system based on a comparison of a guaranteed bandwidth at the airport communication system and a combination of the number of radio resources reserved to the other aircraft and the type of radio resources reserved to the other aircraft.

21. The computer program product of claim 20, wherein determining the availability of radio resources at each airport communication system further comprises:
for each airport communication system, determining the amount of available bandwidth that will be available for the aircraft at the airport of the airport communication system based on a comparison of a guaranteed bandwidth at the airport communication system and a combination of the number of radio resources reserved to the other aircraft and the type of radio resources reserved to the other aircraft.

22. The computer program product of claim 2, wherein determining the availability of radio resources at each airport communication system further comprises:
for each airport communication system, determining the amount of available bandwidth that will be available for the aircraft at the airport of the airport communication system based on a comparison of a guaranteed bandwidth at the airport communication system and a combination of the number of radio resources reserved to the other aircraft and the type of radio resources reserved to the other aircraft.

23. A method performed by a radio resource management system in communication with multiple airport communication systems located at different airports, the method comprising:
receiving a request to transfer data from an aircraft communication system within an aircraft to an airport communication system of the multiple airport communication systems;
determining an availability of radio resources at each airport communication system of the multiple airport communication systems based on the request, wherein the determining the availability of radio resources at each airport communication system comprises determining an estimated amount of time that an aircraft transporting the aircraft communication system will be located at different airports serviced by the different airport communication systems of the multiple airport communication systems based on an estimated arrival time of the aircraft at the different airports and an estimated departure time of the aircraft at the different airports;
selecting an airport communication system from the multiple airport communication systems to transfer the data based on the determined availability of radio resources at the airport communication system; and
reserving an amount of radio resources of the selected airport communication system of the multiple airport communication systems for the aircraft communication system to transfer the data,
wherein reserving the amount of radio resources comprises reserving the amount of radio resources of the selected airport communication system is further based on an amount of time the aircraft is anticipated to remain at an airport location serviced by the selected airport communication system, during which the data can be transferred to the selected airport communication system.

24. A method performed by a radio resource management system in communication with multiple airport communication systems located at different airports, the method comprising:
receiving a request to transfer data from an aircraft communication system within an aircraft to an airport communication system of the multiple airport communication systems;
determining an availability of radio resources at each airport communication system of the multiple airport communication systems based on the request, wherein the determining the availability of radio resources at each airport communication system comprises determining an estimated amount of time that an aircraft transporting the aircraft communication system will be located at different airports serviced by the different airport communication systems of the multiple airport communication systems based on an estimated arrival time of the aircraft at the different airports and an estimated departure time of the aircraft at the different airports;

selecting an airport communication system from the multiple airport communication systems to transfer the data based on the determined availability of radio resources at the airport communication system; and reserving an amount of radio resources of the selected airport communication system of the multiple airport communication systems for the aircraft communication system to transfer the data, wherein reserving the amount of radio resources comprises reserving the amount of radio resources of the selected airport communication system is further based on an amount of time the aircraft is anticipated to remain at an airport location serviced by the selected airport communication system, during which the data can be transferred to the selected airport communication system.

* * * * *